June 30, 1953 A. BAUER 2,643,636
CENTRIFUGAL COATING APPLYING MACHINE
Filed July 2, 1951 4 Sheets-Sheet 1
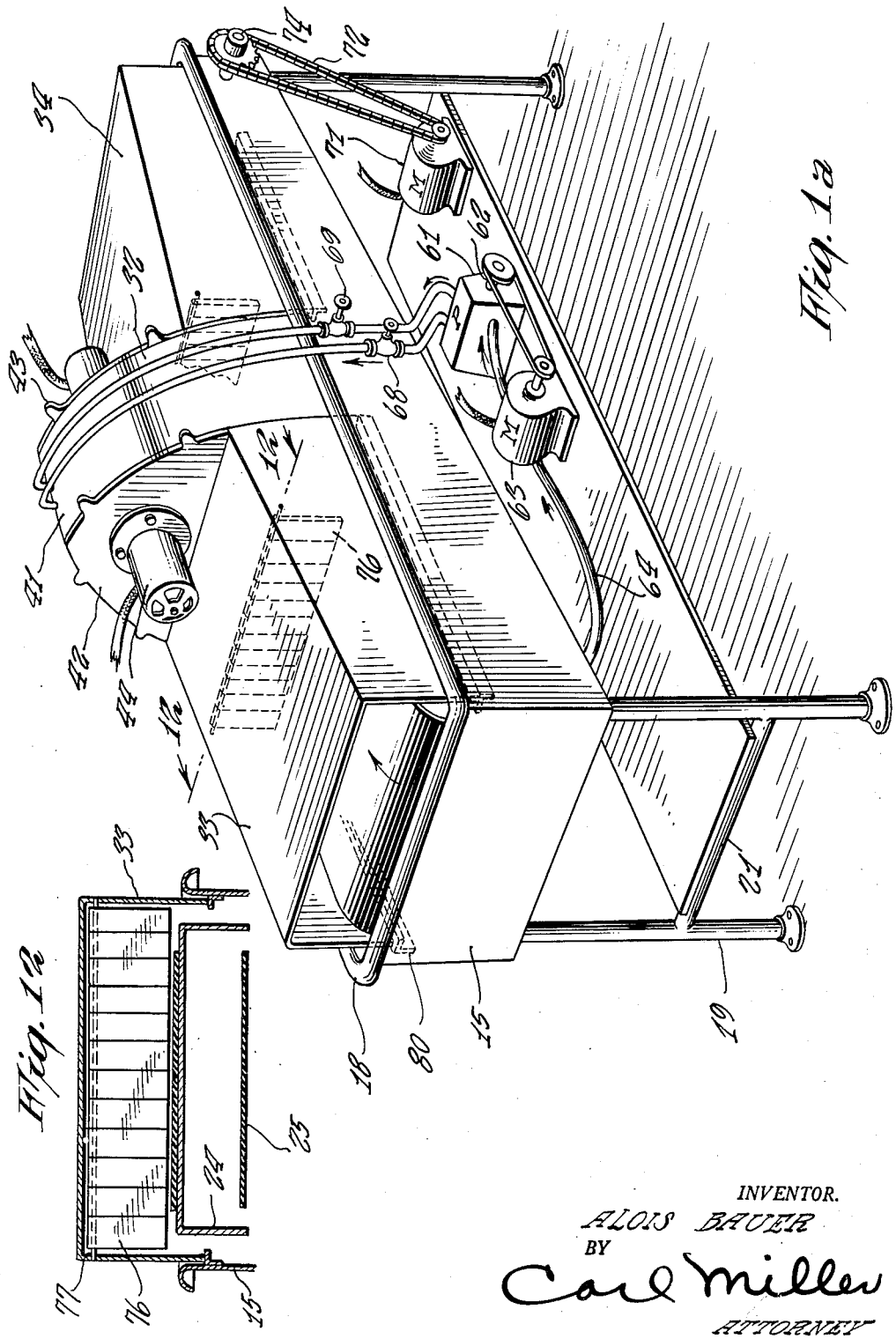
INVENTOR.
ALOIS BAUER
BY Carl Miller
ATTORNEY

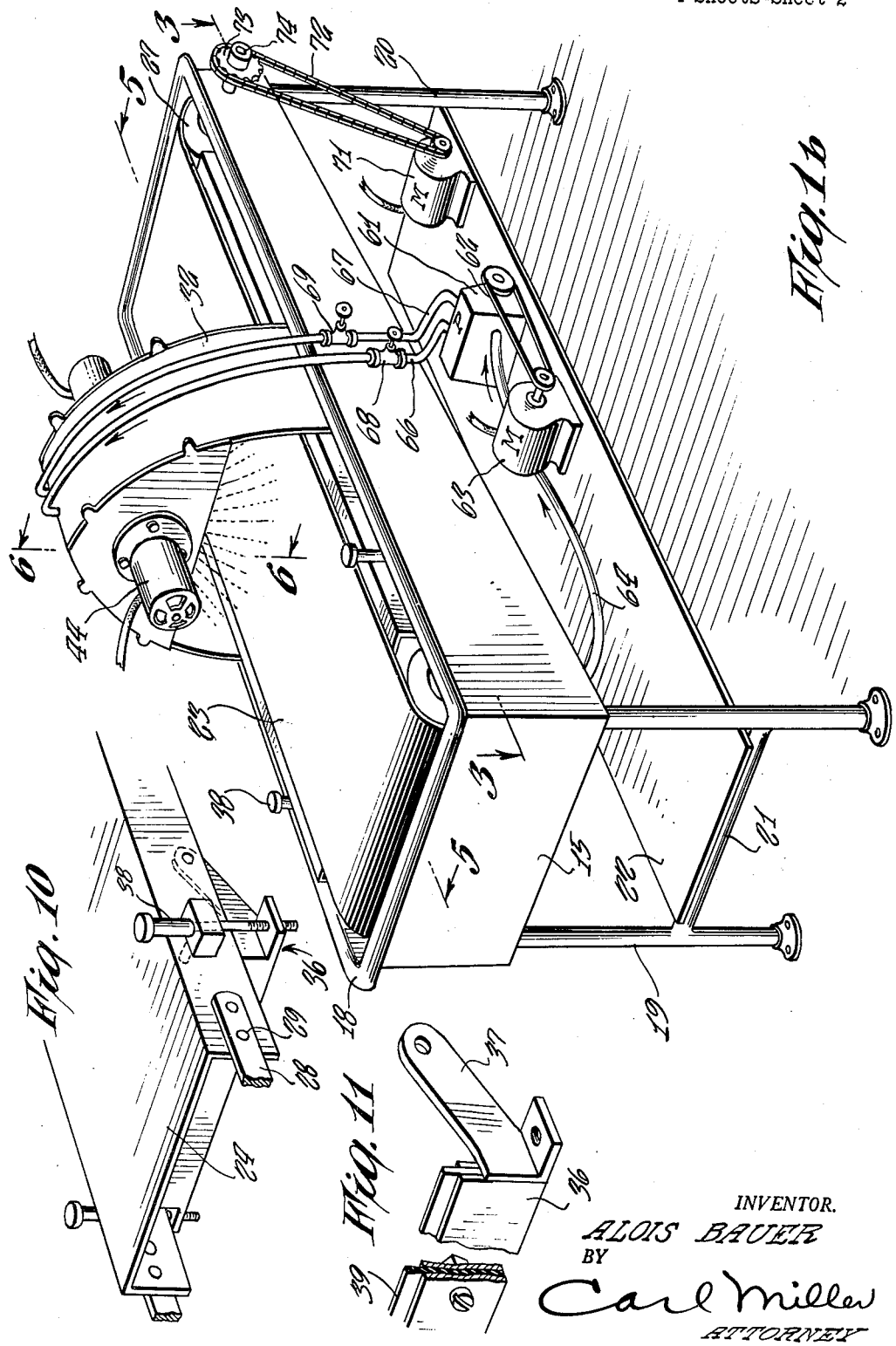

June 30, 1953  A. BAUER  2,643,636
CENTRIFUGAL COATING APPLYING MACHINE
Filed July 2, 1951  4 Sheets-Sheet 3
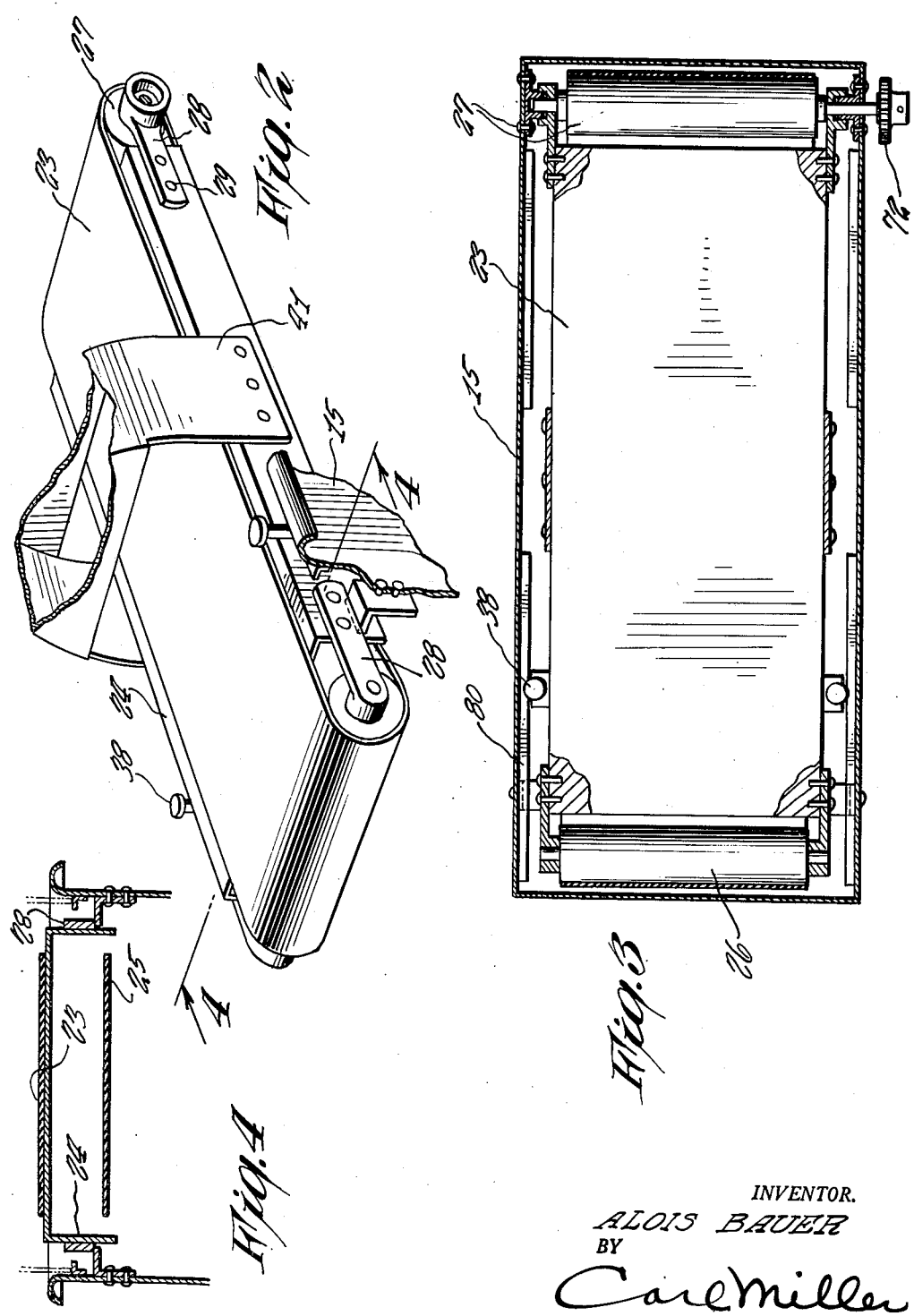
INVENTOR.
ALOIS BAUER
BY
Carl Miller
ATTORNEY

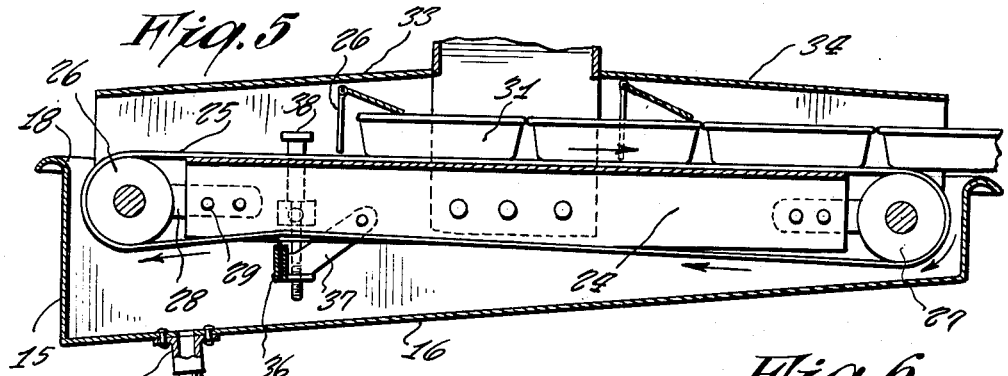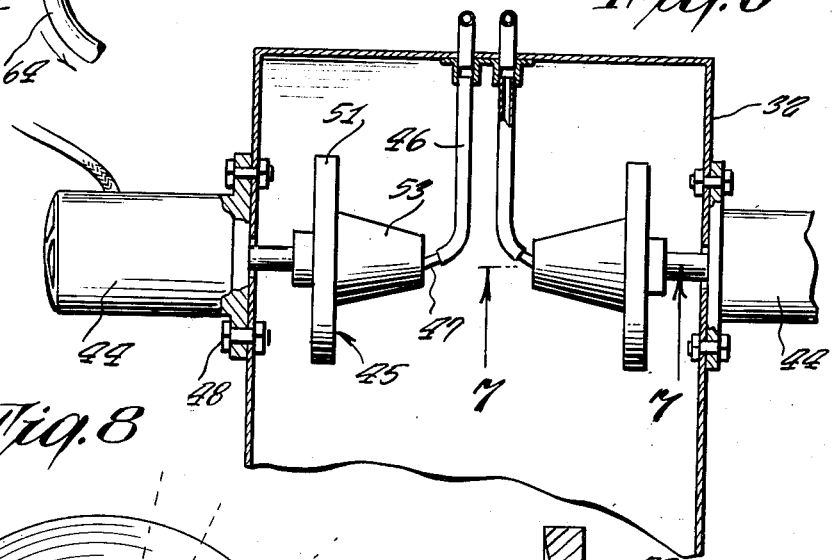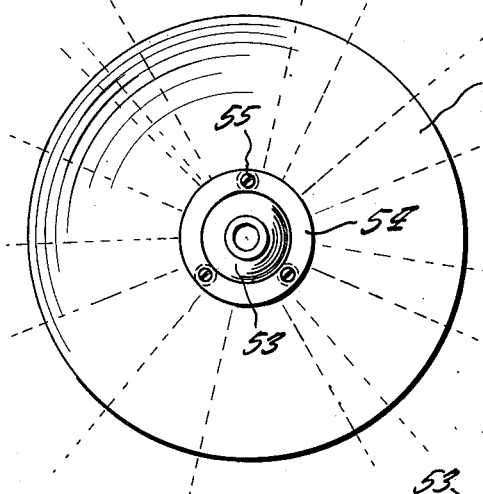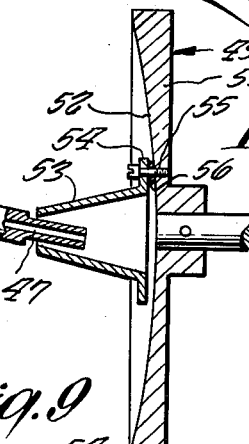

Patented June 30, 1953

2,643,636

UNITED STATES PATENT OFFICE 2,643,636

CENTRIFUGAL COATING APPLYING MACHINE

Alois Bauer, Brooklyn, N. Y.

Application July 2, 1951, Serial No. 234,733

1 Claim. (Cl. 118—316)

This invention relates to a centrifugal coating applying machine for use in bakeries for greasing baking pans and for use in places where large surfaces are to be coated as in painting and lacquering.

It is an object of the present invention to provide in a baking establishment a machine wherein the pans in which the baking is effected can be quickly and easily coated with grease and wherein this grease will be evenly distributed over the surface and interior of the pan and wherein the excess grease will be collected in a bottom reservoir and utilized again to coat other pans and wherein the operation is effected by merely inserting the pan in the machine on a travelling conveyor and removing it fully greased from the opposite end of the conveyor.

It is another object of the invention to provide in a baking pan greasing machine employing a conveyor means for closing off the spraying compartment so little of the grease is lost to the conveyor and outwardly of the ends of the machine and whereby as the baking pans move on the conveyor they are automatically closed off by hanging members under which the baking pans are passed.

It is another object of the invention to provide in a coating applying machine effected by centrifugal action a novel spraying arrangement wherein the grease is delivered by means of a pump to flinging elements which will atomize and disburse the liquid evenly onto the baking pans passing through the machine.

Other objects of the present invention are to provide a coating applying machine operable by centrifugal action and having self-contained pumping means for delivering the liquid to the centrifugal elements, which is of simple construction, inexpensive to manufacture, has a minimum number of parts, compact, easy to operate, consumes little space and efficient in operation.

For a better understanding of the invention, reference may be had to the following detailed description taken in connection with the accompanying drawing, in which:

Fig. 1-A is a perspective view of the centrifugal action coating applying machine embodying the features of the present invention;

Fig. 1-B is a perspective view of the machine with the forward and rear covers over the conveyor being removed to show the interior construction of the machine;

Fig. 2 is a fragmentary perspective view of the machine with parts broken away to show the conveyor assembly;

Fig. 3 is a transverse sectional view taken on line 3—3 of Fig. 1-B;

Fig. 4 is a transverse sectional view taken on line 4—4 of Fig. 2;

Fig. 5 is a longitudinal sectional view taken on line 5—5 of Fig. 1-B;

Fig. 6 is an enlarged fragmentary sectional view taken on line 6—6 of Fig. 1-B and through the centrifugal spring compartment;

Fig. 7 is an enlarged sectional view taken through one of the flinging elements and on line 7—7 of Fig. 6;

Fig. 8 is a front elevational view of one of the grease flinging elements;

Fig. 9 is a perspective view of the front part of the flinging element;

Fig. 10 is a fragmentary perspective view of the conveyor support and showing the adjustable wiping member thereon;

Fig. 11 is a fragmentary view of the wiping member;

Fig. 12 is a transverse sectional view of the sealing elements, taken on line 12—12 of Fig. 1-A.

Referring now to the figures, 15 represents a tank adapted to confine a liquid and having an inclined bottom 16. This tank has a rim 18 surrounding the top thereof and is supported by leg assemblies 19 and 20 disposed at the respective opposite ends of the tank. Upon these legs and between cross bar elements 21 thereof, there is supported a shelf 22. Fitted into the tank is a conveyor assembly indicated generally at 23. This conveyor assembly comprises an inverted channel member 24, for supporting the conveyor belt 25. Connected to the sides of the inverted channel support 24 and at the ends thereof are respectively rollers 26 and 27. Bracket members 28 secured by rivets to the sides of the support 24, as indicated at 29, serve to secure said brackets. The conveyor belt will extend over the top of the support and will return underneath the same. A baking pan or other article to be coated with grease or other coating material, as indicated at 31, is put on the conveyor belt 25 and is automatically taken to the opposite end thereof.

In the center of the tank and extending upwardly thereover is a spraying device indicated generally at 32. Hoods 33 and 34 connect with the opposite sides of this spraying device 32 and extend laterally outwardly therefrom and over the conveyor belt and the tank. The purpose of the hoods and of the spray device constructed as they are is to confine the spray within a given space and to return the spray or surplus coating material to the bottom of the tank 15.

In order that the belt will be clean, from underneath there is provided a scraper device 36 suspended on adjustable members 37 connected respectively to the opposite sides of the channel support 24. Adjusting screws carried by the sides of the channel and operable by a turning motion and as indicated at 38 serve to adjust the scraping device 36, and more particularly the scraping element 39 thereof toward and away from the conveyor belt 25. Excess liquid which is carried over on the belt will be removed and dropped into the lower end of the tank 15.

The spraying device 32 includes a hood 41 that extends from one side of the tank to the other and to which there are connected, at the opposite sides thereof, plates 42 and 43, which extend partially down the ends of the member 41 and which respectively support electric motors 44 that serve respectively to rotate flinging elements 45 to which the liquid is fed by means of hose members 46 bearing nozzle ends 47.

Each electric motor 44 is fixed to the hood end piece by bolts 48 extending through flanges of the motor and through the end piece.

The flinging element is formed of two parts, one of which is indicated at 51 and is in the form of a large plate on which there is a dished surface 52. A second part 53 of conical shape and hollow is fixed by a flange 54 and screws 55 to the dished surface and so that liquid will pass outwardly under the flange. The flange and the part 53 are spaced from the surface by a washer 56 on each screw 55. The nozzle end 47 of the hose 46 enters the conical part 53 to deliver liquid and directs this liquid with force against the dished surface 52. With the plate element 51 being rotated at high speed, the liquid, such as grease, paint or the like, will be forced outwardly along the surface and flung downwardly on to the baking pans or other elements moving with the conveyor and under the spraying device 32.

In order to supply liquid under pressure to the respective nozzle ends 47, there is provided a pressure pump 61 which is operated from a belt 62 connected to an electric motor 63. The hose 64 extends from a fitting 65 in the bottom of the tank to the pump 61. Two outlet conduits 66 and 67 extend from the pump and have respectively valve elements 68 and 69 therein. These valve elements can be operated to control the supply of the liquid to the centrifugal spraying elements 45.

An electric motor 71 is connected by a chain 72 to a sprocket 73 which is in turn connected to roller 27 by its shaft 74 so that the conveyor will be thereby operated. The electric motors can be connected to any electric supply source.

In the space under each hood 33 and 34 there is provided a row of tiltable closure elements 76. These elements 76 are pivoted upon a transverse shaft 77. As the pans 31 are extended underneath these elements, the elements will be raised and will thereafter upon the pan being passed a sufficient distance drop to a closed position. They also serve to close off the space while being elevated.

The hood members 33 and 34 are supported at their edges upon inwardly extending angle members or brackets 80 connected to the sides of the tank. The bottom of the tank 16 being inclined downwardly will provide sufficient body of the liquid to be collected to pass outwardly through the fitting 69 and hose 64.

It should now be apparent that there has been provided a machine which can easily coat articles laid on a conveyor and extended through and under the sprayer arrangement and also a machine particularly adaptable for the coating of baking pans with grease.

While various changes may be made in the detail construction, it shall be understood that such changes shall be within the spirit and scope of the appended claim:

Having thus set forth and disclosed the nature of my invention, what is claimed is:

In a machine for applying coating material upon articles and having a tank with a driven conveyor mounted in the tank having an upper exposed carrying surface at the upper level of said tank, the combination, with a hollow hood mounted upon the tank intermediate the ends thereof and above said conveyor, power driven flinging elements rotatably mounted upon an axis disposed substantially in the direction of movement of the said conveyor beneath said hood above said conveyor for spraying the coating material upon articles passed beneath said elements upon said conveyor, means for supplying the coating material under pressure to the flinging elements, and movable means for closing off the ends of the material applying zone beneath said hood upon said conveyor allowing articles to enter said zone while traveling upon said conveyor and to leave said zone after having been sprayed with the coating material from said flinging elements, wherein the flinging elements are two in number and are spaced apart transversely of the longitudinal direction of the conveyor and mutually directed in opposite directions toward the sides of said high dome portion of the hood.

ALOIS BAUER.

References Cited in the file of this patent

UNITED STATES PATENTS

| Number | Name | Date |
|---|---|---|
| 1,543,235 | Scheminger | June 23, 1925 |
| 1,736,799 | Planert | Nov. 26, 1929 |
| 1,784,853 | Tiffany | Dec. 16, 1930 |
| 1,862,380 | Larson | June 7, 1932 |
| 2,220,275 | Preston | Nov. 5, 1940 |
| 2,319,865 | James | May 25, 1943 |
| 2,459,324 | Kellner | Jan. 18, 1949 |
| 2,495,328 | Harrison | Jan. 24, 1950 |
| 2,557,479 | Smith | June 19, 1951 |